United States Patent
Goto

(10) Patent No.: US 10,560,969 B2
(45) Date of Patent: Feb. 11, 2020

(54) COMMUNICATION APPARATUS, CONTROL METHOD FOR COMMUNICATION APPARATUS, AND PROGRAM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/964,201

(22) Filed: Dec. 9, 2015

(65) Prior Publication Data

US 2016/0174119 A1   Jun. 16, 2016

(30) Foreign Application Priority Data

Dec. 12, 2014 (WO) .................. PCT/JP2014/082988

(51) Int. Cl.
*H04W 76/10* (2018.01)
*H04W 76/16* (2018.01)
(Continued)

(52) U.S. Cl.
CPC .......... *H04W 76/10* (2018.02); *H04W 76/16* (2018.02); *H04W 84/12* (2013.01); *H04W 88/06* (2013.01)

(58) Field of Classification Search
USPC ...................................................... 370/331
See application file for complete search history.

(56) References Cited

U.S. PATENT DOCUMENTS

| 9,408,017 B2 * | 8/2016 | Ouchi | H04W 4/80 |
| 2002/0053274 A1 * | 5/2002 | Yahata | G10H 1/24 |
| | | | 84/634 |

(Continued)

FOREIGN PATENT DOCUMENTS

| CN | 101674214 A | 3/2010 |
| CN | 102769482 A | 11/2012 |

(Continued)

OTHER PUBLICATIONS

Motorola; Juana Nakfourl; Methods for out-of-band peer to peer WLAN configuration; IP.com Journal, IP.com No. IPCOM000175673D; Oct. 17, 2008 ; pp. 1-13.

*Primary Examiner* — Gregory B Sefcheck
*Assistant Examiner* — Majid Esmaeilian
(74) *Attorney, Agent, or Firm* — Canon U.S.A., Inc. IP Division

(57) ABSTRACT

A communication apparatus that performs wireless communication using a first communication system and a second communication system includes a determining unit that determines an operation mode selected from a first operation mode and a second operation mode, the first operation mode being an operation which is used in the second communication system and in which the communication apparatus communicates with a different communication apparatus in a wireless network created by the communication apparatus, the second operation mode being an operation which is used in the second communication system and in which the communication apparatus communicates with the different communication apparatus in a wireless network created by an external apparatus, and a storing unit that stores information, based on the selected operation mode, used to establish a connection with one of the wireless networks.

11 Claims, 4 Drawing Sheets

(51) Int. Cl.
*H04W 84/12* (2009.01)
*H04W 88/06* (2009.01)

(56) References Cited

U.S. PATENT DOCUMENTS

| | | | | |
|---|---|---|---|---|
| 2009/0247077 | A1* | 10/2009 | Sklovsky | G06F 9/445 455/41.1 |
| 2010/0113090 | A1* | 5/2010 | Lin | H04B 1/0064 455/553.1 |
| 2011/0007723 | A1* | 1/2011 | Shichino | H04N 21/43615 370/338 |
| 2013/0073388 | A1* | 3/2013 | Heath | G06Q 50/01 705/14.53 |
| 2013/0237152 | A1* | 9/2013 | Taggar | H04B 5/00 455/41.1 |
| 2013/0247117 | A1* | 9/2013 | Yamada | G08C 17/02 725/93 |
| 2014/0111594 | A1* | 4/2014 | Schuh | B41J 11/42 347/218 |
| 2014/0152593 | A1* | 6/2014 | Wu | G06F 3/0416 345/173 |
| 2014/0185088 | A1* | 7/2014 | Lee | H04N 1/00342 358/1.15 |
| 2014/0197927 | A1* | 7/2014 | Kwon | H04W 48/02 340/10.1 |
| 2014/0204224 | A1 | 7/2014 | Fujita | |
| 2014/0240753 | A1* | 8/2014 | Anno | G06F 3/1236 358/1.15 |
| 2015/0131642 | A1* | 5/2015 | Amano | H04W 12/04 370/338 |
| 2015/0219637 | A1* | 8/2015 | Egli | C12Q 1/6837 435/5 |
| 2015/0244937 | A1* | 8/2015 | Kunishige | H04N 5/23245 348/220.1 |
| 2015/0334284 | A1* | 11/2015 | Fukushima | H04W 52/02 348/211.2 |
| 2015/0351004 | A1* | 12/2015 | Ko | H04W 48/10 455/411 |
| 2015/0355828 | A1* | 12/2015 | Kiyomasa | E05F 15/70 715/771 |
| 2016/0259528 | A1* | 9/2016 | Foss | G06F 3/0482 |

FOREIGN PATENT DOCUMENTS

| | | |
|---|---|---|
| CN | 103281759 A | 9/2013 |
| CN | 104170409 A | 11/2014 |
| EP | 2645812 A2 | 10/2013 |
| JP | 2006-303924 A | 11/2006 |
| JP | 2007-166538 A | 6/2007 |
| JP | 2008-283590 A | 11/2008 |
| JP | 2009147901 A | 7/2009 |
| JP | 2009-225060 A | 10/2009 |
| JP | 2010-056955 A | 3/2010 |
| JP | 2011250471 A | 12/2011 |
| JP | 2013529403 A | 7/2013 |
| JP | 2013197876 A | 9/2013 |
| JP | 2014127871 A | 7/2014 |
| JP | 2014168213 A | 9/2014 |
| JP | 2014179927 A | 9/2014 |

* cited by examiner

COMMUNICATION APPARATUS, CONTROL METHOD FOR COMMUNICATION APPARATUS, AND PROGRAM

TECHNICAL FIELD

Aspects of the present invention generally relate to a communication apparatus, a control method for the communication apparatus, and a program.

BACKGROUND ART

Recently, a technique called hand over has been used. This technique is one for performing communication by automatically switching two communication means using respective communication systems which are different from each other. For example, the technique is applied to a communication apparatus such as an apparatus in which a first communication system (communication system before hand-over) corresponds to infrared communication or near-field communication (NFC) and in which a second communication system (communication system after hand-over) corresponds to a wireless LAN or Bluetooth™. In such a communication apparatus, for example, the first communication system is used to transmit communication parameters of the second communication system, and the communication parameters are used to establish a connection using the second communication system automatically.

For example, in PTL 1, a technique is disclosed in which a first communication system is used to exchange information about second communication systems and encryption systems and in which, when an appropriate system is detected, data transfer means is switched to the second communication system.

CITATION LIST

Patent Literature

PTL 1: Japanese Patent Laid-Open No. 2007-166538

Thus, use of the hand-over technique improves usability. However, in the case of a communication apparatus supporting multiple types of operation mode serving as the second communication system, a problem arises when information about an operation mode different from the operation mode which is currently being operated is transmitted to a target apparatus by using the first communication system.

SUMMARY OF INVENTION

Aspects of the present invention provide a communication apparatus which supports multiple operation modes and which causes a target apparatus to obtain more appropriate information.

According to aspects of the present invention, a communication apparatus capable of performing wireless communication using a first communication system and a second communication system includes a determining unit and a storage unit. The determining unit determines which operation mode is selected from among a first operation mode and a second operation mode. The first operation mode is an operation mode which is used in the second communication system and in which the communication apparatus communicates with a different communication apparatus in a wireless network created by the communication apparatus. The second operation mode is an operation mode which is used in the second communication system and in which the communication apparatus communicates with the different communication apparatus in a wireless network created by an external apparatus. When the first operation mode is selected, the storage unit stores first information in a storage unit as information to be obtained by the different communication apparatus through the first communication system. The first information establishes a connection with the wireless network created by the communication apparatus. When the second operation mode is selected, the storage unit stores second information in the storage unit as information to be obtained by the different communication apparatus through the first communication system. The second information establishes a connection with the wireless network created by the external apparatus.

Further features of the present disclosure will become apparent from the following description of exemplary embodiments with reference to the attached drawings.

DESCRIPTION OF EMBODIMENTS

First Embodiment

Figure 1:
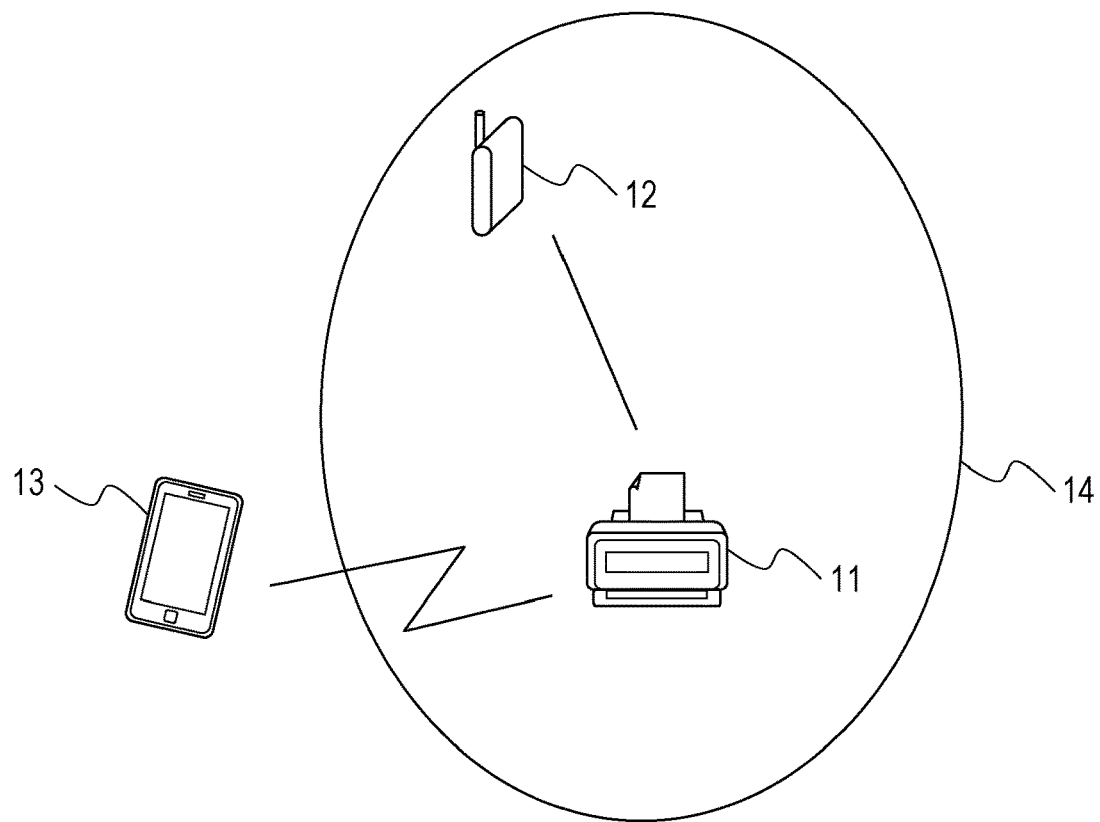
FIG. 1 is a diagram illustrating the system configuration according to a first embodiment.

A communication apparatus according to the present embodiment will be described below in detail by referring to the drawings.

FIG. 1 is a diagram illustrating the system configuration according to the present embodiment. In the present embodiment, a printer 11 participates in a network 14 which is a wireless LAN constructed by an access point 12, as a wireless LAN (wireless LAN in conformity with IEEE 802.11 series) station. Participation of a smartphone 13, which does not participate in the network 14, in the wireless network 14 enables communication between the smartphone 13 and the printer 11 via the access point 12. In the present embodiment, the smartphone 13 and the printer 11 perform NFC (Near Field Communication), and the smartphone 13 obtains information about the wireless network 14 from the printer 11. The smartphone 13 uses the information obtained from the printer 11 through NFC to participate in the wireless network 14.

Figure 2:
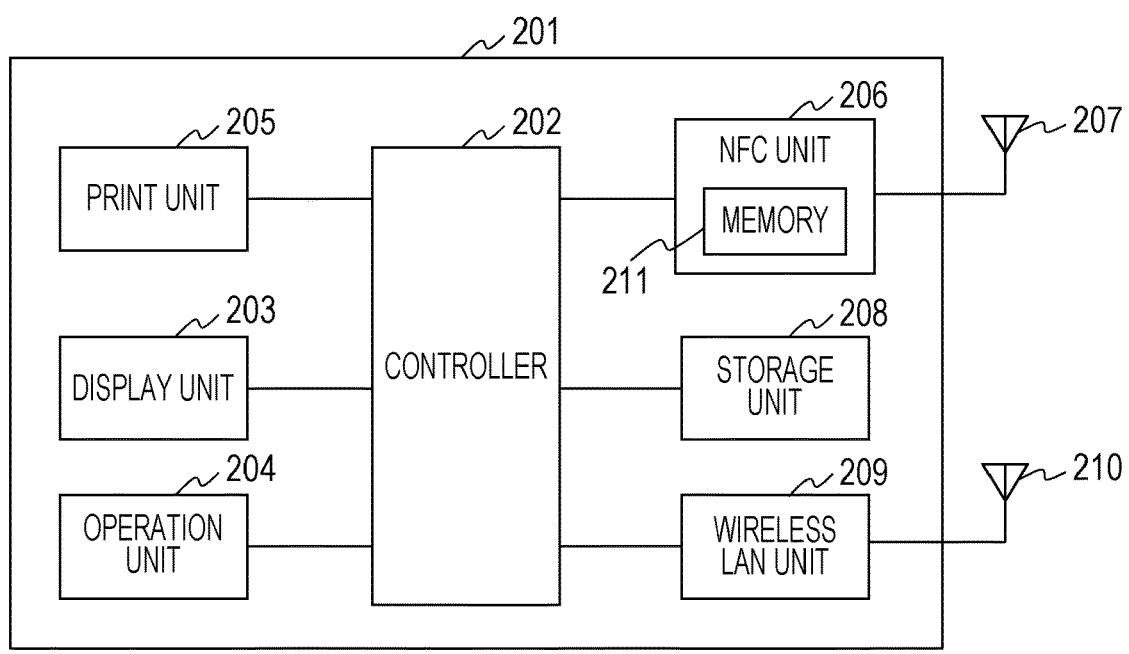
FIG. 2 is a hardware block diagram of a printer according to the first embodiment.

FIG. 2 is a diagram illustrating the hardware configuration of the printer 11 according to the present embodiment. A printer 201 indicates the entire printer.

A controller 202 controls the entire apparatus by executing control programs stored in a storage unit 208. The controller 202 includes one or more processors, such as a CPU and an MPU. The storage unit 208 stores the control programs executed by the controller 202, and various types of data such as print data. The storage unit 208 includes one or more memories, such as a ROM, a RAM, an HDD, and a flash memory. In the present embodiment, various operations described by using flowcharts described below are performed in such a manner that the controller 202 executes the control programs stored in the storage unit 208. A display unit 203 performs various display operations, and has a function of outputting information which may be visually recognized as in an LCD or an LED, or a function of outputting sound as in a speaker. The display unit 203 has a function of outputting at least one of visual information and sound information. An operation unit 204 is a unit with which a user performs various input operations to operate the printer 201. The operation unit 204 is constituted by various buttons, a touch panel, and the like. A print unit 205 performs printing on the basis of received print data.

A wireless LAN unit 209 performs communication through a wireless LAN in conformity with IEEE 802.11 series via an antenna 210. The printer 201 is capable of receiving/transmitting data from/to an external apparatus via the wireless LAN unit 209. For example, the printer 201 may receive print data transmitted from the smartphone 13 via the wireless LAN unit 209.

The wireless LAN unit 209 of the printer 201 has a mode in which the wireless LAN unit 209 operates as an access point (AP) in the infrastructure mode defined in the IEEE 802.11 standard and a mode in which the wireless LAN unit 209 operates as a station (STA) in the infrastructure mode. In the description below, the former mode is called the AP mode, and the latter mode is called the STA mode. These operation modes are examples of a first operation mode and a second operation mode. The printer 201 causes the wireless LAN unit 209 to operate in the STA mode, thereby being capable of operating as an STA in the infrastructure mode. When the printer 201 operates as an STA, a connection to an AP (for example, the access point 12) which is present around the printer 201 enables the printer 201 to participate in the network constructed by the AP. In contrast, the printer 201 causes the wireless LAN unit 209 to operate in the AP mode, thereby being also capable of operating as an AP in the infrastructure mode. When the printer 201 operates as an AP, the printer 201 itself creates a wireless LAN network. An apparatus (for example, the smartphone 13) which is present around the printer 201 may recognize the printer 201 as an AP, and may participate in the network created by the printer 201. One or both of the AP mode and the STA mode may be performed at the same time. In the present embodiment, a mode in which the printer 201 performs both of the AP mode and the STA mode at the same time is called the concurrent mode. Programs for operating the printer 201 as described above are stored in the storage unit 208.

An NFC unit 206 performs non-contact near field wireless communication in conformity with the NFC (Near Field Communication) standard via an antenna 207. The NFC unit 206 according to the present embodiment is a so-called NFC tag. Therefore, data written in a memory 211 in the NFC unit 206 is capable of being read by an external apparatus having a reader/writer function even when the controller 202 of the printer 201 is not energized. The memory 211 includes a read-write nonvolatile memory. Data stored in the memory 211 may be updated not only by an external apparatus having an NFC reader/writer function but also by the controller 202 of the printer 201. In the description below, the memory 211 in the NFC unit 206 may be called an NFC tag.

The printer 201 may include hardware modules other than the hardware modules illustrated in FIG. 2. The printer 201 may include hardware modules for performing some of various operations described by using the flowcharts described below.

Figure 3:
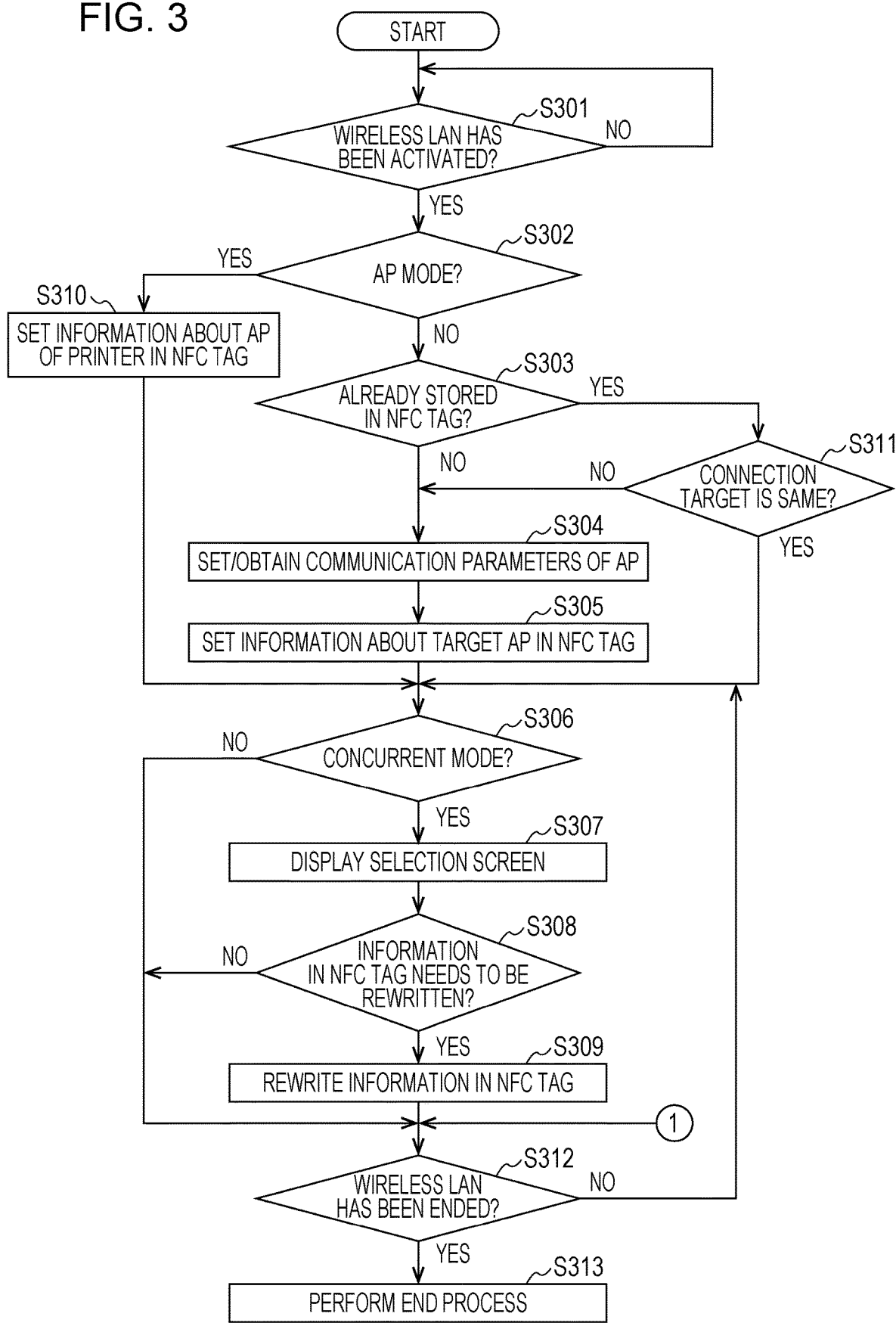
FIG. 3 is a flowchart of a process performed by the printer according to the first embodiment.

FIG. 3 is a flowchart of operations performed when power of the printer 11 according to the present embodiment is turned on. Steps in the flowchart are performed by a CPU in the controller 202 which executes control programs stored in the storage unit 208 of the printer 11.

In S301, the printer 11 determines whether or not the wireless LAN unit 209 has been activated. If the wireless LAN unit has been activated, the printer 11 determines whether the current operation mode of the wireless LAN unit is the AP mode or the STA mode (S302). As a result of the determination, if the operation mode of the wireless LAN unit is the AP mode, the process proceeds to S310. If the operation mode is the STA mode, the process proceeds to S303. Whether the wireless LAN unit 209 is to operate in the AP mode or in the STA mode may be selected by a user at his/her choice when the wireless LAN is activated. Alternatively, information describing which mode is a mode in which the wireless LAN unit 209 is to operate may be set in advance in the printer 11.

In S310, the printer 11 writes information about the wireless LAN network created by the wireless LAN unit 209 serving as an AP, in the NFC tag 211. The information written in the NFC tag 211 is communication parameters required for a connection to the wireless LAN created by the printer 11, such as an SSID serving as a network identifier, an encryption key, an encryption method, an authentication key, and an authentication method. In addition, identification information (for example, an MAC address) for identifying the apparatus (in this case, the printer 11) which has created the wireless LAN with which a connection is to be established is written in the NFC tag 211. Other information may be written in the NFC tag 211.

In S303, the printer 11 determines whether or not the NFC tag 211 already stores information about a wireless LAN. If such information is already stored, the printer 11 determines whether or not the AP with which a connection is to be established this time is the same as the AP stored in the NFC tag 211 (S311). If the printer 11 determines that the APs are not the same in S311, or if the printer 11 determines that no information is stored in the NFC tag in S303, the printer 11 obtains information about the AP with which a connection is to be established this time (identification information and communication parameters of the AP), in S304. The printer 11 writes the obtained information in the NFC tag 211 (S305).

The printer 11 determines whether or not the concurrent mode has been performed (S306). That is, the printer 11 determines whether the STA mode has been started in a state in which the AP mode is being performed, or the AP mode has been started in a state in which the STA mode is being performed. If the concurrent mode has not been executed, the printer 11 determines whether or not the wireless LAN has been ended (S312), and repeatedly performs the determination process in S306 until the wireless LAN is ended.

In S306, if the printer 11 determines that the concurrent mode has been performed, the printer 11 displays a selection screen on the display unit 203 (S307). The selection screen is a screen for causing a user to select which information is to be written in the NFC tag 211, "information about the wireless LAN in the AP mode" or "information about the wireless LAN in the STA mode". If "information about the wireless LAN in the AP mode" is selected, communication parameters of the wireless LAN created by the wireless LAN unit 209 of the printer 11 serving as an AP, and the identification information of the printer 11 are written in the NFC tag 211. If "information about the wireless LAN in the STA mode" is selected, information about an AP with which a connection is to be established this time is written in the NFC tag 211. In S308, the printer 11 determines whether or not information stored in the NFC tag 211 needs to be rewritten, in response to the selection result in S307. If the printer 11 determines that information needs to be rewritten, the printer 11 rewrites the information in the NFC tag 211 on the basis of the selection result in S307.

In S312, the printer 11 determines whether or not the wireless LAN has been ended. If the wireless LAN has been ended due to a user operation or other factors, the printer 11 performs an end process in S313. The detail of the end process will be described in detail below.

As described above, the printer 11 according to the present embodiment stores information in the NFC tag in accordance with the operation mode of the wireless LAN which is currently being used. Specifically, when the printer 11 operates in the AP mode, the printer 11 writes the communication parameters of the wireless LAN created by the printer 11 and the identification information of the printer 11 in the NFC tag. When the printer 11 operates in the STA mode, the printer 11 writes the communication parameters of the wireless LAN created by an external AP with which a connection is established, and identification information of the AP in the NFC tag. Thus, the smartphone 13 reads information written in the NFC tag of the printer 11, whereby the smartphone 13 may be automatically connected to the wireless LAN to which the printer 11 is currently being connected (or which is created by the printer 11). In addition, when the printer 11 operates in the concurrent mode, a user selects information that is to be written in the NFC tag, whereby the smartphone 13 may be connected to a connection target desired by the user.

In the example in FIG. 3, the selection screen is displayed in response to the determination which is made in S306 and which is that the concurrent mode has been performed. Alternatively, information written in the NFC tag when the concurrent mode is performed may be registered in advance as a setting in the printer 11. In this case, a user may input the setting in advance from a setting screen or the like displayed on the display unit 203 of the printer 11.

Figure 4:
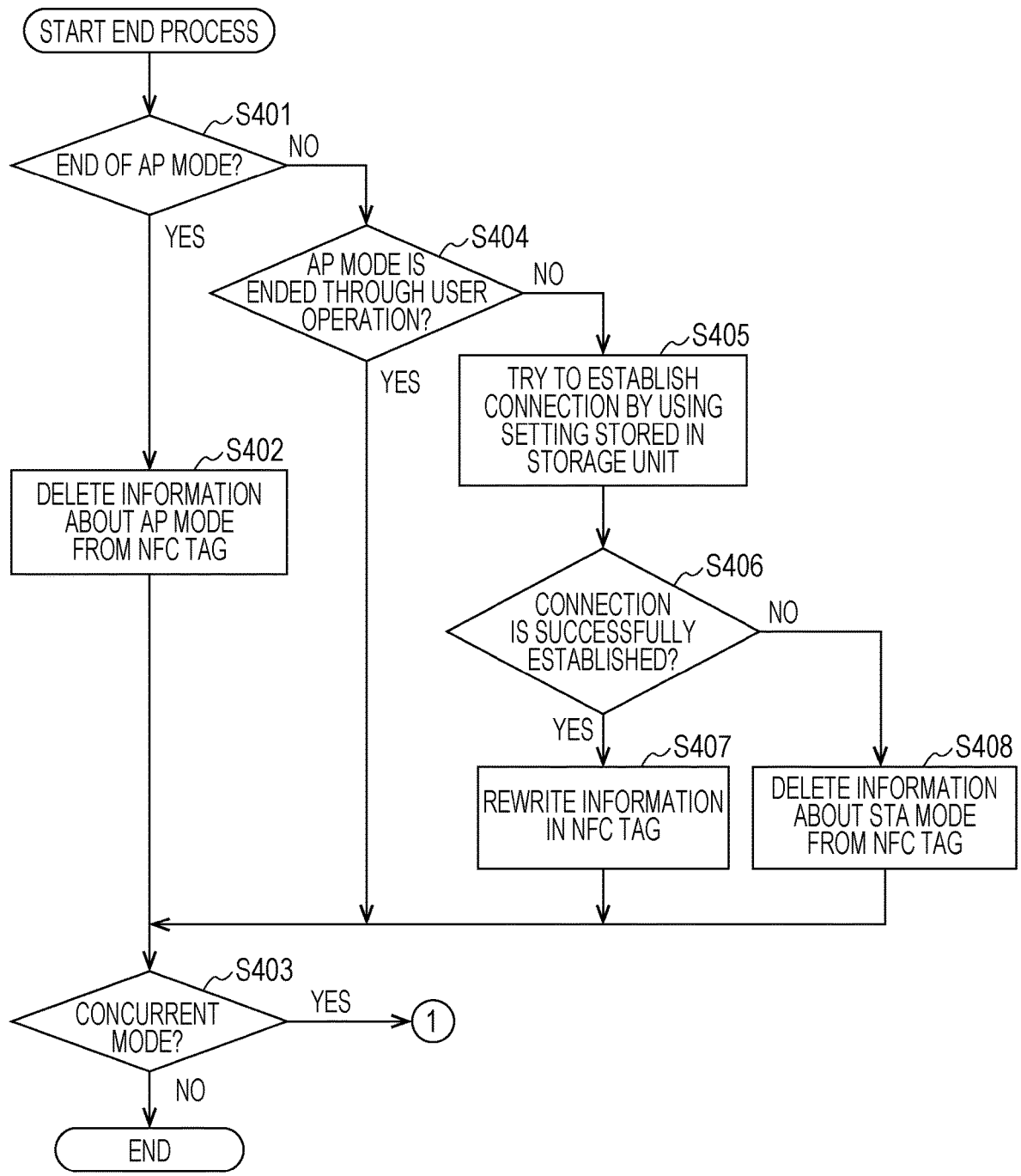
FIG. 4 is a flowchart of a process performed by the printer according to the first embodiment.

FIG. 4 is a flowchart of the end process in S313. By using FIG. 4, the end process performed by the printer 11 will be described.

The printer 11 determines whether or not the operation mode of the wireless LAN which has been ended is the AP mode (S401). If the printer 11 determines that the wireless LAN ended in the AP mode, the printer 11 deletes information about the AP mode, that is, information about the communication parameters required to establish a connection with the wireless LAN created by the printer 11, the identification information of the printer 11, and the like, from the NFC tag 211 (S402). To "delete information from the NFC tag" in the present embodiment involves every form for making the data inaccessible substantially, such as overwriting of the data with other data, and managing of the data as invalid data, in addition to actual clearing (deleting) of the data from the memory.

After that, the printer 11 determines whether or not the printer 11 operates in the concurrent mode (S403). That is, the printer 11 determines whether or not, even when one operation mode of the wireless LAN has been ended, the printer 11 is operating in the other operation mode, in S403. If the printer 11 determines that the printer 11 operates in the concurrent mode, the printer 11 proceeds the process to S312 in FIG. 3, and continues the process. If the printer 11 determines that the printer 11 does not operate in the concurrent mode, the printer 11 ends the end process illustrated in FIG. 4.

In S401, if the printer 11 determines that the operation mode of the wireless LAN which has been ended is not the AP mode, that is, if the printer 11 determines that the operation mode of the wireless LAN which has been ended is the STA mode, the process proceeds to S404. In S404, the printer 11 determines whether or not the operation of ending the wireless LAN is performed by a user. If the printer 11 determines that the operation is performed by a user, the printer 11 proceeds the process to S403 without deleting information in the NFC tag 211. If the printer 11 determines that the operation is not performed by a user, that is, if the external AP to which the printer 11 is being connected has ended the wireless LAN or if the printer 11 becomes incapable of communicating with the external AP to which the printer 11 is being connected, for example, because the printer 11 moves, the process proceeds to S405. In S405, the printer 11 uses communication parameters stored in advance in the storage unit 208 of the printer 11 body, to search for another AP and try to establish a connection with the detected AP. If communication parameters are not stored in advance in the storage unit 208 of the printer 11 body, the process skips S405 and proceeds to S408.

In S406, the printer 11 determines whether or not a connection is successfully established with another AP as a result of the try in S405. If a connection is successfully established with another AP, the printer 11 writes the communication parameters used for the connection to the AP and identification information of the AP in the NFC tag 211, thereby updating information stored in the NFC tag 211 (S407). If a connection fails to be established with another AP, the printer 11 deletes the information stored in the NFC tag 211 (S408). After the process of S407 or S408 is ended, the process proceeds to S403.

As described above, when the printer 11 ends the wireless LAN, information written in the NFC tag is deleted or maintained in accordance with the operation mode of the wireless LAN which has been ended and the factor of the end (a user operation or an external factor). Thus, for example, communication parameters which may be used again when a wireless LAN is activated next time may remain in the NFC tag. In contrast, communication parameters which are unlikely to be used when a wireless LAN is activated next time may be deleted so that unnecessary information does not remain in the NFC tag. In the example in FIG. 4, information about the AP mode is deleted in S402. Alternatively, after information about the AP mode is deleted, a PIN code used when the PIN mode of WPS is used and when the printer 11 operates in the AP mode may be written in the NFC tag 211. WPS stands for Wi-Fi Protected Setup. Next time, for example, a smartphone which reads the PIN code displays a message that the readout result of the NFC tag indicates a PIN code, and prompts a user to perform a WPS process. This provides a helpful process performed when the printer 11 establishes a connection with the smartphone 13 next time.

As described above, according to the present embodiment, for a printer which is capable of operating in multiple operation modes serving as operation modes of a wireless LAN, information according to the operation mode which is being operated may be written in the NFC tag. Thus, NFC is used to enable a smartphone to be easily connected to a wireless LAN in which the printer is operating.

Second Embodiment

In the first embodiment, when a wireless LAN is activated, a user selects whether the AP mode or the STA mode is to be operated. The present embodiment is made in consideration of a case in which automatic selection as to which operation mode is to be operated is made. The system configuration and the apparatus configuration of the present embodiment are similar to those in FIGS. 1 and 2, and will not be described.

Figure 5:
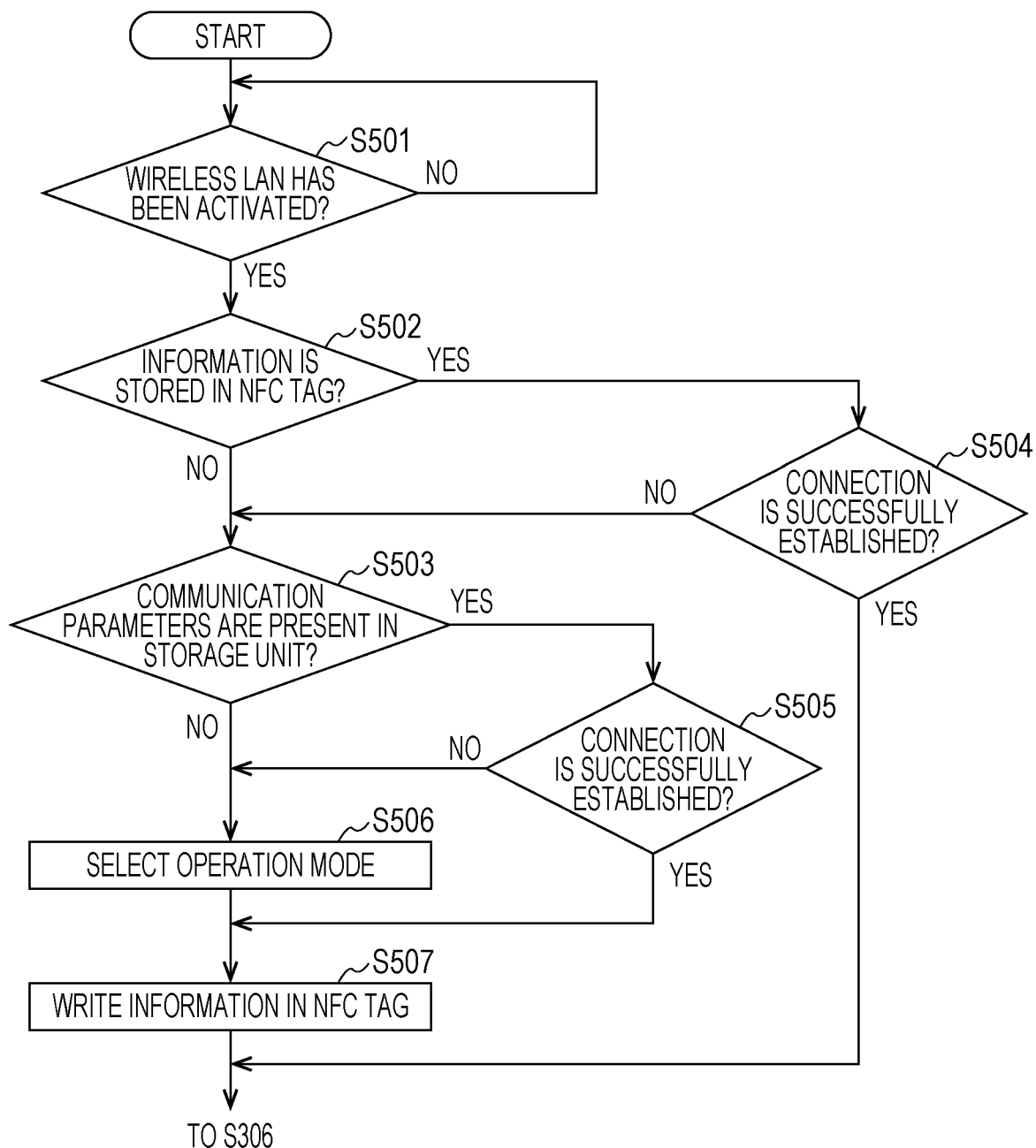
FIG. 5 is a flowchart of a process performed by a printer according to a second embodiment.

FIG. 5 is a flowchart of operations performed when power of the printer 11 according to the present embodiment is turned on. Steps in the flowchart are performed by a CPU of the controller 202 which executes control programs stored in the storage unit 208 of the printer 11.

In S501, the printer 11 determines whether or not the wireless LAN unit 209 has been activated. If the wireless LAN unit has been activated, the printer 11 determines whether or not the NFC tag 211 stores communication parameters of a wireless LAN (S502). If communication parameters are stored, the printer 11 uses the stored communication parameters to establish a connection with the wireless LAN. In this step, if the stored communication parameters are those for an external AP, the printer 11 tries to establish a connection with the wireless LAN created by the AP. If communication parameters are those for a wireless LAN that is to be created by the printer 11, the printer 11 uses the communication parameters to create a wireless LAN network. The printer 11 determines whether a connection is successfully established with an external AP or a wireless LAN network is successfully created, by using the communication parameters stored in the NFC tag 211 (S504). If the printer 11 determines that the connection is successfully established, the process proceeds to S306 in FIG. 3 in the first embodiment. If the connection is not successfully established, the process proceeds to S503.

In S503, the printer 11 determines whether or not communication parameters for a connection to a wireless LAN are stored in the storage unit 208 of the printer body. If communication parameters are stored, the printer 11 uses the communication parameters to try to establish a connection with the wireless LAN. Then, the printer 11 determines whether or not a connection is successfully established with the wireless LAN (S505). If a connection is successfully established, the process proceeds to S507, and the printer 11 writes the communication parameters stored in the storage unit 208 of the printer body in the NFC tag. If a connection fails to be established, the process proceeds to S506. In S506, the printer 11 causes a user to select whether the AP mode or the STA mode is to be operated. In this step, a selection screen may be displayed on the display unit 203. If the user selects the STA mode to be operated, an external AP may be searched for. When multiple APs are detected, the list result may be displayed, and the user may select an AP with which a connection is to be established. The printer operates according to the operation mode selected in S506. If the printer operates in the AP mode, the printer writes information about the wireless LAN created by the printer (communication parameters and identification information of the printer) in the NFC tag. If the printer operates in the STA mode, the printer writes information about the wireless LAN of the external AP with which a connection has been established (communication parameters and identification information of the AP) in the NFC tag. After that, the process proceeds to S306 illustrated in FIG. 3 in the first embodiment.

As described above, in the present embodiment, when the printer activates a wireless LAN, a user does not select whether the AP mode or the STA mode is to be operated, and the operation mode is automatically determined by using information stored in the storage unit. Therefore, for example, when communication parameters of an external AP to which the printer was connected are stored, the printer may automatically establish a connection with the AP without a user operation which requires time and effort. The communication parameters for the connection may be automatically written in the NFC tag.

Other Embodiments

In the above-described embodiments, a wireless LAN in conformity with NFC and IEEE 802.11 series is described as an example. However, this is not limiting. Instead of NFC, any near field wireless communication, such as Bluetooth™, a Bluetooth Low Energy (BLE) system defined in Bluetooth 4.0, or infrared communication (IrDA), may be applied as near field wireless communication. As a wireless communication system after hand-over, instead of a wireless LAN in conformity with IEEE 802.11 series, any wireless communication system such as Bluetooth™ may be applied.

In the above-described embodiments, a smartphone and a printer are described as examples. However, this is not limiting. Any communication apparatus supporting the above-described near field wireless communication and a wireless communication system different from the near field wireless communication, such as a PC, a digital household appliance, or a wearable terminal, may be applied.

Communication parameters written in the NFC tag may include communication parameters required for IP communication, such as an IP address and a routing table, and information required for network authentication, such as a user ID and a password.

In the above-described embodiments, a communication apparatus supporting multiple operation modes serving as operation modes of a wireless LAN is taken as an example, and information corresponding to the operation mode which is being operated is written in the NFC tag. This operation mode may be replaced with a wireless communication system. For example, if a communication apparatus supporting all of a wireless LAN, Bluetooth™, and NFC is currently operating a wireless LAN, communication parameters of the wireless LAN may be written in the NFC tag. If Bluetooth™ is being currently operated, communication parameters of Bluetooth™ may be written in the NFC tag. As a result, the wireless communication system in which the communication apparatus is currently operating may be handed over to a smartphone or the like which has read the information in the NFC tag.

Aspects of the present invention may be achieved through a process in which a program for implementing one or more functions in the above-described embodiments is applied to a system or apparatus via a network or a storage medium, and in which one or more processors in a computer in the system or apparatus read and execute the program. Alternatively, aspects of the present invention may be achieved through a circuit implementing one or more functions (for example, an ASIC).

Aspects of the present invention enable a communication apparatus supporting multiple operation modes to cause a target apparatus to obtain more appropriate information.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of International Patent Application No. PCT/JP2014/082988, filed Dec. 12, 2014, which is hereby incorporated by reference herein in its entirety.

The invention claimed is:

1. A communication apparatus capable of performing wireless communication via a first communication method and a second communication method compliant with the IEE 802.11 standard, the communication apparatus comprising:
   an execution unit configured to execute an operation mode selectively from among a first operation mode, a second operation mode, and a third operation mode, the first operation mode being an operation mode which is used in the second communication method and in which the communication apparatus performs communication compliant with the IEEE802.11 standard via a wireless network created by the communication apparatus, the second operation mode being an operation mode which is used in the second communication method and in which the communication apparatus performs communication compliant with the IEEE802.11 standard via a wireless network created by an external apparatus, and the third operation mode being an operation mode in which communication compliant with the IEEE802.11 standard based on the first operation mode and communication compliant with the IEEE802.11 standard based on the second operation mode are concurrently performed;
   a selection unit configured to select either a first communication parameter for establishing a connection with the wireless network created by the communication apparatus or a second communication parameter for establishing a connection with the wireless network created by the external apparatus as a communication parameter to be provided to another communication apparatus via the first communication method, based on a selection by a user in a case where the third operation mode is executed by the execution unit;
   a providing unit configured to provide a communication parameter to the another communication apparatus, the communication parameter which is to be provided by the providing unit being switched between the first communication parameter and the second communication parameter, wherein the providing unit provides the first communication parameter without the selection by the user based on that the execution unit executes the first operation mode, the second communication parameter without the selection by the user based on that the execution unit executes the second operation mode, and either the first communication parameter or the second communication parameter selected by the selection unit based on that the execution unit executes the third operation mode; and
   a communication unit configured to communicate with the another communication apparatus via the second communication method compliant with the IEEE802.11 standard, to which the communication parameter has been provided by the providing unit via the first communication method, by using the operation mode corresponding to the communication parameter provided by the providing unit.

2. The communication apparatus according to claim 1, wherein the first communication method is near-field communication.

3. The communication apparatus according to claim 1, wherein the first operation mode is a mode in which the communication apparatus operates as an access point compliant with the IEEE802.11 standard and the second operation mode is a mode in which the communication apparatus operates as a station compliant with the IEEE802.11 standard.

4. The communication apparatus according to claim 1, further comprising:
   a storage unit configured to store the information provided by the providing unit;
   wherein the another communication apparatus acquires the communication parameter stored by the storage unit via the first communication method as the communication parameter provided by the providing unit.

5. The communication apparatus according to claim 4, further comprising:
   a deleting unit configured to, in a case where communication via the second communication method compliant with the IEEE802.11 standard ends, delete the communication parameter from the storage unit.

6. The communication apparatus according to claim 4, wherein the storage unit is a storage unit having a near-field communication tag included in the communication apparatus, and
   wherein the communication parameter information stored in the storage unit is obtained using a near-field communication reader/writer included in the another communication apparatus.

7. The communication apparatus according to claim 1, wherein the first communication method is near field wireless communication that is in conformity with Bluetooth®.

8. The communication apparatus according to claim 1, further comprising:
   a display control unit configured to perform control to display a screen for accepting a user operation for selecting the communication parameter to be provided to the another communication apparatus in a case where the third operation mode is executed;
   wherein, based on the user operation accepted via the screen displayed by the display control unit, the selection unit selects the first communication parameter or the second communication parameter.

9. The communication apparatus according to claim 8, wherein the display control unit does not display the screen based on that the first operation mode or the second operation mode is executed by the execution unit, and the display control unit displays the screen based on that the third operation mode is executed by the execution unit.

10. A control method for a communication apparatus capable of performing wireless communication via a first communication method and a second communication method compliant with the IEEE802.11 standard, the control method comprising the steps of:
   executing an operation mode selectively from among a first operation mode, a second operation mode, and a third operation mode, the first operation mode being an operation mode which is used in the second communication method and in which the communication apparatus performs communication compliant with the IEEE802.11 standard via a wireless network created by the communication apparatus, the second operation mode being an operation mode which is used in the second communication method and in which the communication apparatus performs communication compliant with the IEEE802.11 standard via a wireless network created by an external apparatus, and the third operation mode being an operation mode in which communication compliant with the IEEE802.11 standard based on the first operation mode and communication compliant with the IEEE802.11 standard based on the second operation mode are concurrently performed;

selecting either a first communication parameter for establishing a connection with the wireless network created by the communication apparatus or a second communication parameter for establishing a connection with the wireless network created by the external apparatus as a communication parameter to be provided to another communication apparatus via the first communication method, based on a selection by a user in a case where the third operation mode is executed;

providing a communication parameter to the another communication apparatus, the communication parameter which is to be provided being switched between the first communication parameter and the second communication parameter, wherein the providing unit provides the first communication parameter without the selection by the user based on executing the first operation mode, the second communication parameter without the selection by the user based on executing the second operation mode, and either the first communication parameter or the second communication parameter selected based on that the execution unit executes the third operation mode; and communicating with the another communication apparatus via the second communication method compliant with the IEEE802.11 standard, to which the communication parameter has been provided via first communication method, by using the operation mode corresponding to the communication parameter provided.

11. A non-transitory computer-readable storage medium storing a program for causing a computer to execute a control method for a communication apparatus capable of performing wireless communication via a first communication method and a second communication method compliant with the IEEE802.11 standard, the control method comprising the steps of:

executing an operation mode selectively from among a first operation mode, a second operation mode, and a third operation mode, the first operation mode being an operation mode which is used in the second communication method and in which the communication apparatus performs communication compliant with the IEEE802.11 standard via a wireless network created by the communication apparatus, the second operation mode being an operation mode which is used in the second communication method and in which the communication apparatus performs communication compliant with the IEEE802.11 standard via a wireless network created by an external apparatus, and the third operation mode being an operation mode in which communication compliant with the IEEE802.11 standard based on the first operation mode and communication compliant with the IEEE802.11 standard based on the second operation mode are concurrently performed;

selecting either a first communication parameter for establishing a connection with the wireless network created by the communication apparatus or a second communication parameter for establishing a connection with the wireless network created by the external apparatus as a communication parameter to be provided to another communication apparatus via the first communication method, based on a selection by a user in a case where the third operation mode is executed;

providing a communication parameter to the another communication apparatus, the communication parameter which is to be provided being switched between the first communication parameter and the second communication parameter, wherein the providing unit provides the first communication parameter without the selection by the user based on executing the first operation mode, the second communication parameter without the selection by the user based on executing the second operation mode, and either the first communication parameter or the second communication parameter selected based on that the execution unit executes the third operation mode; and communicating with the another communication apparatus via the second communication method compliant with the IEEE802.11 standard, to which the communication parameter has been provided via first communication method, by using the operation mode corresponding to the communication parameter provided.

* * * * *